United States Patent [19]

Preskitt

[11] Patent Number: 4,648,287

[45] Date of Patent: Mar. 10, 1987

[54] PEDAL STROKE ADJUSTER FOR A BICYCLE OR EXERCISE MACHINE

[76] Inventor: Jay Preskitt, 537 Redwood Ave., Milpitas, Calif. 95035

[21] Appl. No.: 539,537

[22] Filed: Oct. 5, 1983

[51] Int. Cl.$^4$ ............................................... G05G 1/14
[52] U.S. Cl. .................... 74/594.1; 74/594.4; 74/600
[58] Field of Search ............... 74/594.1, 594.4, 600, 74/522, 525

[56] References Cited

U.S. PATENT DOCUMENTS

| | | | |
|---|---|---|---|
| 359,609 | 3/1887 | Jeffery | 74/594.1 X |
| 363,522 | 5/1887 | Knous | 74/594.1 |
| 385,717 | 7/1888 | Kibbe | 74/594.1 |
| 394,135 | 12/1888 | Roedel | 74/594.1 |
| 421,969 | 2/1890 | Pond | 74/594.1 |
| 426,670 | 4/1890 | Keating | 280/21.1 |
| 446,280 | 2/1891 | Blakely | 74/594.1 |
| 1,227,743 | 5/1917 | Burgendorff | 74/594 |
| 2,533,011 | 12/1950 | Hill | 74/594.1 |
| 3,081,645 | 3/1963 | Bergfors | 74/594.1 |
| 3,789,696 | 2/1974 | Beam, III | 74/594.1 |
| 3,888,136 | 6/1975 | Lapeyre | 74/594.1 |

*Primary Examiner*—Gary L. Smith
*Assistant Examiner*—Rodney M. Lindsey
*Attorney, Agent, or Firm*—Hamrick, Hoffman, Guillot & Kazubowski

[57] ABSTRACT

A pedal stroke adjuster includes a pair of crank frames each of which is mounted on one of the crank arms of a bicycle or exercise machine. A mounting bracket, mounting blocks and spacers are used to align each crank frame in a vertical position when connected to a crank arm. The sides of the crank frame provide guide rails for a pedal mounting block and in one embodiment of the invention one of the guide rails is notched to receive a spring-loaded detent latch that is located in the pedal mounting block. A finger operated release mechanism is provided so that the latch may be removed from the notch and the position of the pedal mounting block changed. In an alternate embodiment, each guide rail is notched. The notches are offset so that the detent latches can be readily contained in the confined space of the block. In another embodiment of the invention, a threaded rod is used to move the pedal mounting block up and down within the crank frame and along the guide rails. Yet another embodiment of the invention, provides threaded apertures spaced along the pedal mounting bar that is attached to the crank arm as described hereinabove.

5 Claims, 10 Drawing Figures

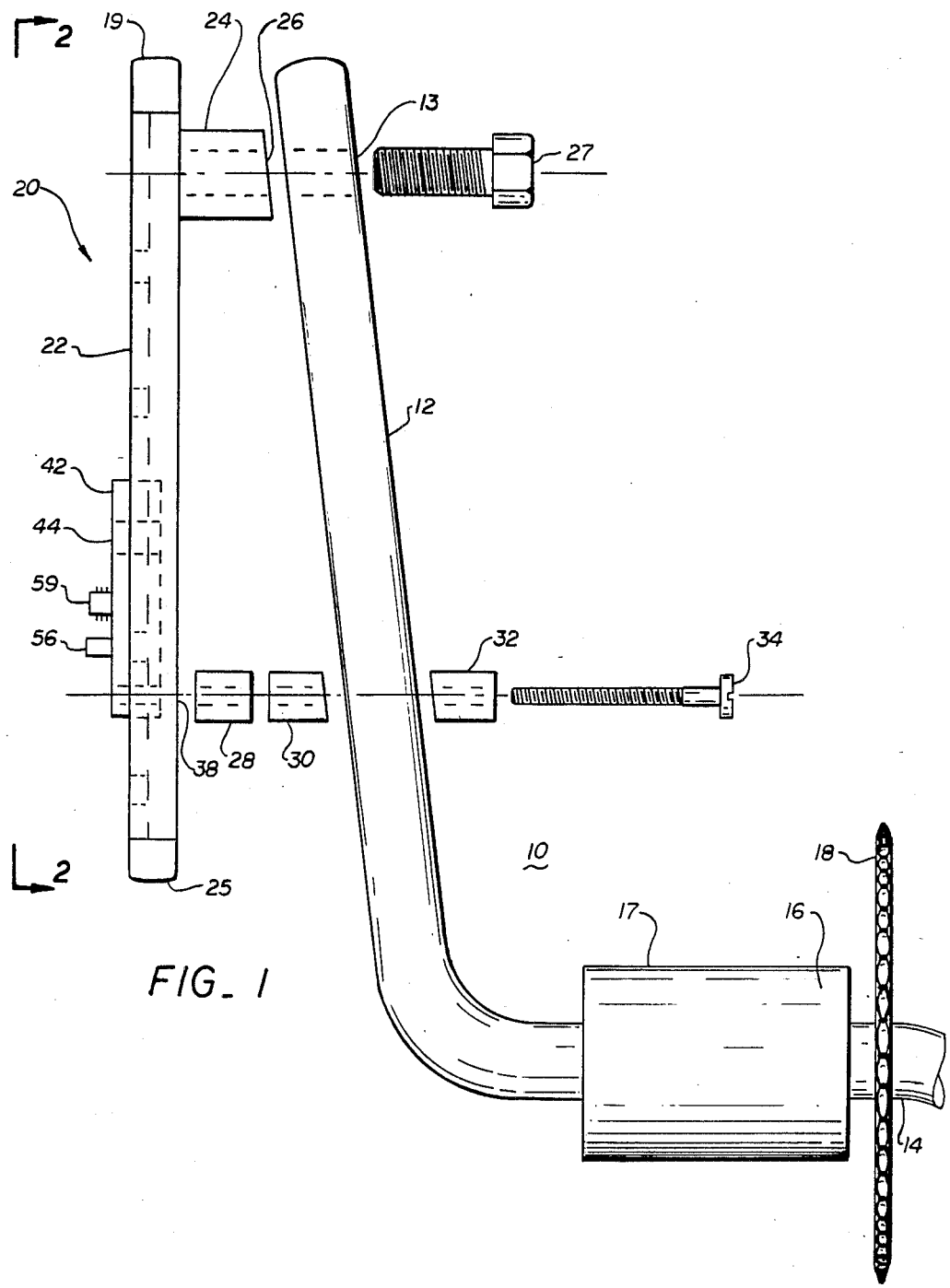
FIG_1

PEDAL STROKE ADJUSTER FOR A BICYCLE OR EXERCISE MACHINE

BACKGROUND OF THE INVENTION

1. Field of the Invention

This invention relates generally to foot powered vehicles such as bicycles and stationary exercise bicycles and similar devices, and in particular, to crank adjusting mechanisms for such devices.

2. Background Description

Devices for the adjustment of the stroke length for a bicycle crank have been necessary for some time and many and various devices have been designed to accomplish such a result. One such arrangement is disclosed in U.S. Pat. No. 363,522, granted May 24, 1887 for "A Crank for a Velocipede", inventor Jay. Knous. A crank arm with a series of continuous apertures for accepting the pedal pin are positioned near the distal end of the crank arm. The threaded end of the pedal pin extends through the apertures and is secured to the crank by a threaded nut.

An adjustable crank is also shown in U.S. Pat. No. 421,969, granted Feb. 25, 1890, to inventor S. N. Pond. In this case, the end of the pedal pin is shaped to slide up and down in a guide and has a threaded aperture centered therein for accepting a threaded rod that is used to move the pedal up and down. A pair of beveled pinion gears are attached to the threaded rod, one being positioned within the guide area and the other being positioned at the top of the crank adjacent the bearing housing. Also a pair of racks are mounted on a plate or collar that is designed to slide vertically on a fork to which the crank end is attached. The top rack can be positioned so as to engage with the inboard pinion and the lower rack may be positioned to engage with the outboard pinion. The top rack, when engaged with its associated pinion, tends to raise the pedal, that is shorten the stroke, and the other tends to lengthen the stroke. In this way, the pedal stroke can be adjusted to suit the rider and once this is accomplished, the racks are positioned so as to not engage the pinions when the operator pedals the bike. A problem with this device is that in order to make the installation on a bicycle, it is necessary to form a hole in the shaft to permit passage of the rod or bar on which the pinions are attached. Further, it would appear that the device is connected directly to the drive wheel of the velocipede and not to the standard crank arm employed in present day bicycles.

SUMMARY OF THE PRESENT INVENTION

It is an object of the invention to provide an adapter for a standard crank arm which permits adjustment of the stroke length.

It is another object of the invention to provide an adjustable crank arm that may be connected directly to the bolt or spindle which extends outwardly from each side of the bearing housing.

Briefly, the invention includes a crank frame adapted to be securely connected to a crank arm of a bicycle or exercise machine. The crank frame includes a pair of sides and top and bottom end plates that are attached to the ends of the sides to hold the sides so that they are fixed in a parallel, spaced apart relationship. The sides of the crank frame provide guide rails for a pedal mounting block that has grooved sides that fit snugly onto the guide rails. Adjustment means is provided by which the location of the pedal mounting block may be set, whereby the desired pedal stroke length is obtained.

It is an advantage of the present invention that adjustment of the pedal stroke range may be quickly and easily accomplished and a small stroke range achieved.

It is another advantage of the present invention that is is strong and durable.

These and other objects and advantages of the present invention will no doubt become apparent to those skilled in the art after having read the following detailed description which makes reference to the several figures of the drawing.

IN THE DRAWING

FIG. 1 is a partially broken elevation view which shows how a pedal stroke adjuster, in accordance with the teaching of this invention, is connected to the crank arm of a bicycle;

FIG. 7 shows how a pedal stroke adjuster may be moved using a threaded rod; and

Figure 8A:
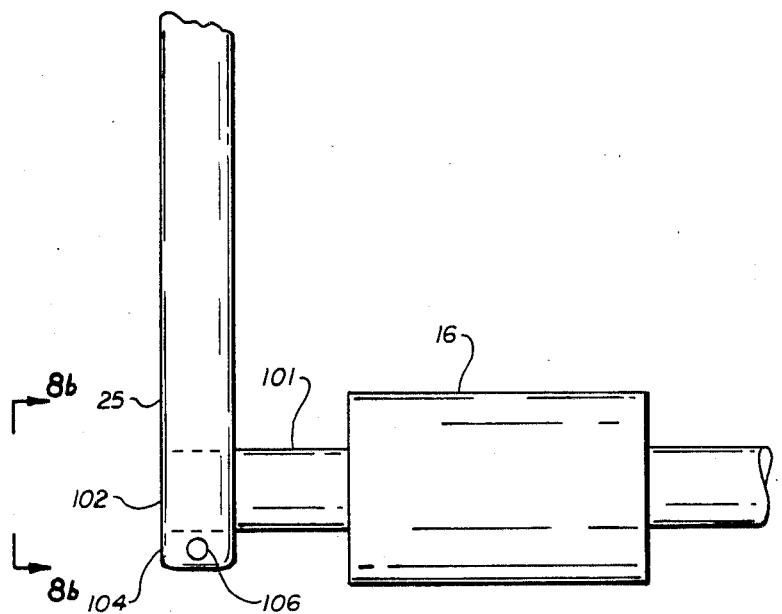
Figure 8B:
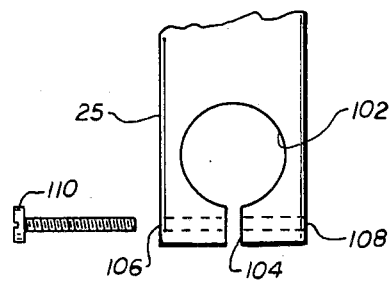

FIG. 8 A is a broken side view of a pedal stroke adjuster which may be directly connected to the bearing stud.

FIG. 8 B is a broken front view of a Pedal Stroke Adjuster which may be directly connected to the bearing stud.

DETAILED DESCRIPTION OF THE PREFERRED EMBODIMENTS

Figure 1A:
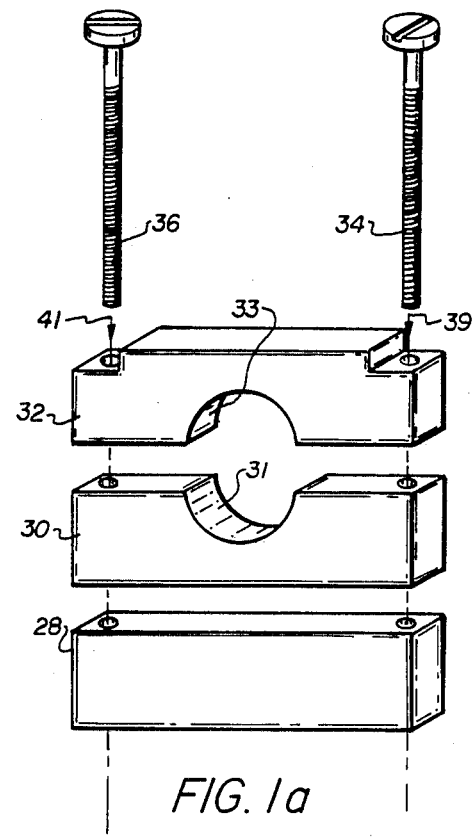
FIG. 1A is a top view of spacer (28) and shaped mounting blocks (30) and (32) and shows the shaped surfaces (31) and (33)

Referring now to FIG. 1, a crank assembly 10 is seen which includes left and right crank arms 12 and 14, respectively, bearing housing 16 through which they are journaled and chain sprocket 18 which provides the driving force connection from the crank arms to the drive wheel of the machine. The crank arms and the portion passing through the housing 16 are often formed of one piece and adapting a pedal adjusting device to such an arrangement has not been heretofore readily accomplished. A pedal, such as 58 in FIG. 3, would normally be attached to crank arm 12 by screwing the threaded pedal pin 60, FIG. 3, into the threaded aperture 13 located at the distal end of the crank arm 12.

Figure 2:
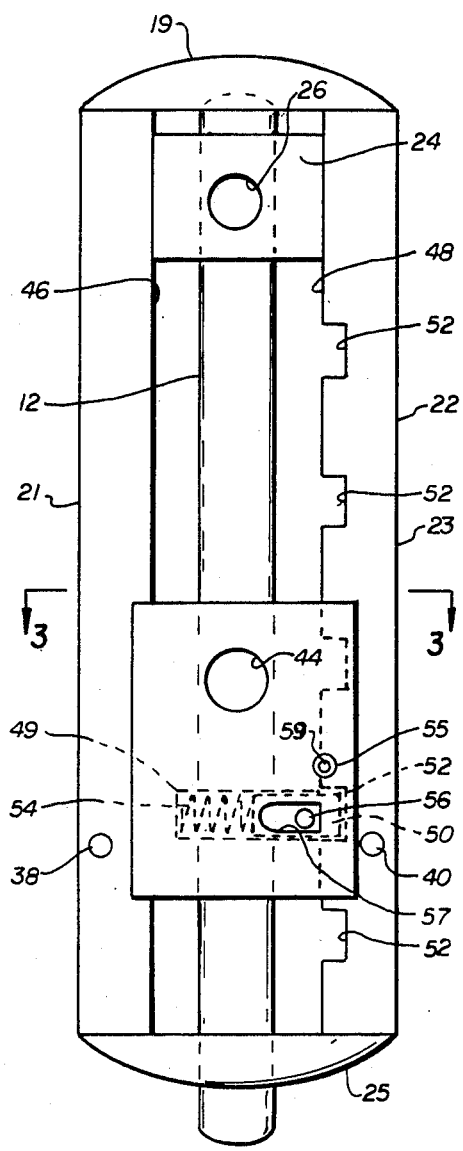
FIG. 2 is a view along the line 2—2 of FIG. 1 and illustrates a number of the essential elements of the pedal stroke adjuster.
Figure 3:
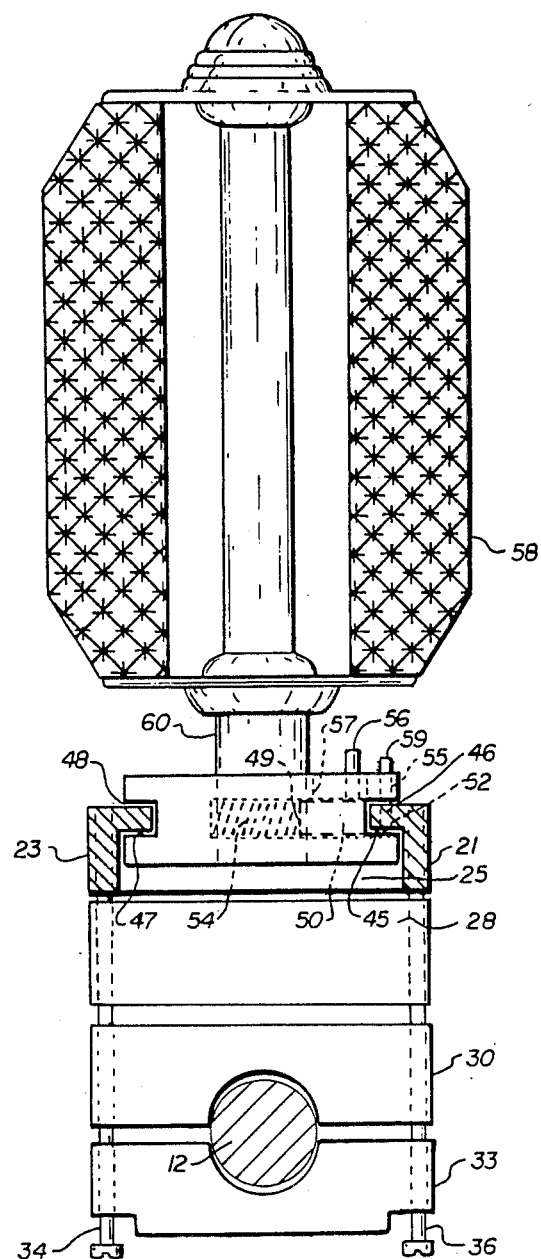
FIG. 3 is a view along the line 3—3 of FIG. 2 which has been inverted 180 degrees and illustrates in more detail the guide rails (46) and (48) and pedal stroke adjuster block (42)

Referring now to FIGS. 1-3, the pedal stroke adjuster of one embodiment of the invention and the manner of attaching the pedal stroke adjuster to a crank arm 12 may be seen. A pedal stroke adjuster assembly 20 includes a crank frame 22 having top member 19, two side members 21 and 23, and a bottom member 25. A mounting bracket 24 is attached or formed thereon and has a threaded aperture 26 so that the distal end of the pedal stroke adjuster assembly 20 may be attached to crank arm 12 by means of bolt 27. It is to be understood that bolt 27 may in fact be a threaded rod which includes an allen head or similar adjusting arrangement at the outboard end thereof. The other end of the pedal stroke adjuster assembly is attached to the crank arm adjacent the bearing housing 16.

As may be seen from FIG. 1, the crank arm of a standard bicycle crank extends at an angle which is less than ninety degrees from the plane parallel with the transverse surface 17 of bearing housing 16. Because it is desirable to position the pedal stroke adjuster assembly to be substantially vertical, i.e., ninety degrees to the transverse surface 17, a spacer 28 is used in combination with the shaped mounting blocks 30 and 32 so as to properly position the pedal stroke adjuster assembly 20. In order to insure that the pedal stroke adjuster assembly is solidly attached to the crank arm 12, the blocks 30 and 32 are shaped to fit tightly to the crank arm. The mounting screws 34 and 36 pass holes 39 and 41 respectively formed through blocks 28, 30 and 32, and into the threaded apertures 38 and 40 of the crank frame 22, so that the interior shaped surfaces 31 and 33 of blocks 30 and 32, respectively, of pedal stroke are forced uptight against the crank arm. The crank frame 20 is secured to the crank arm 12 to that no slippage or other undesired motion will occur between the crank frame 20 and crank arm 12.

The adjustment of the pedal stroke is accomplished by movement of the adjuster block 42 which contains the threaded aperture 44 that accepts the threaded pedal pin 60. Adjuster block 42 rides in a straight guide rail 46 and a notched guide rail 48, which guide rails 46 and 48 are formed from the sides of the frame 22. The notches guide rail 48 is used to accept detent latch 50, which is spring-loaded by means of spring 54 which will force the detent latch 50 into one of the notches 52 when aligned therewith. A hole 49 is formed within the adjuster block 42 to hold the spring 54 and detent 50. The adjuster block 42 has grooves 45 and 47 which fit snugly against the guide rails 46 and 48, respectively, and hold the pedal securely in the selected notch.

In order to facilitate adjustment of the pedal stroke, a detent release member 56 is secured to the detent latch and is accessible from the outboard side of the adjuster block 42 through slot 57 formed in the side of the adjuster block. By finger pressure on the release member 56, the detent latch 50 can be forced against the spring 54 and the latch removed from the selected notch 52. Then the adjuster block 42 can be readily moved up and down along the guide rails so that it may be repositioned by placing detent latch 50 in another notch 52 as is desired by the operator. While not required to create a functional device, the preferred embodiment may include a position tightening mechanism. In such a mechanism a threaded aperture 55 may be formed in adjuster block 42 in a position to intersect the guide rail 48 between notches 52. A screw 59 inserted in threaded aperture 55 may be tightened down against guide rail 48 once the adjuster block 42 is in its selected position. Of course, screw 59 must be loosened before adjuster block 42 can be moved to change the length of the pedal stroke.

Figure 4:
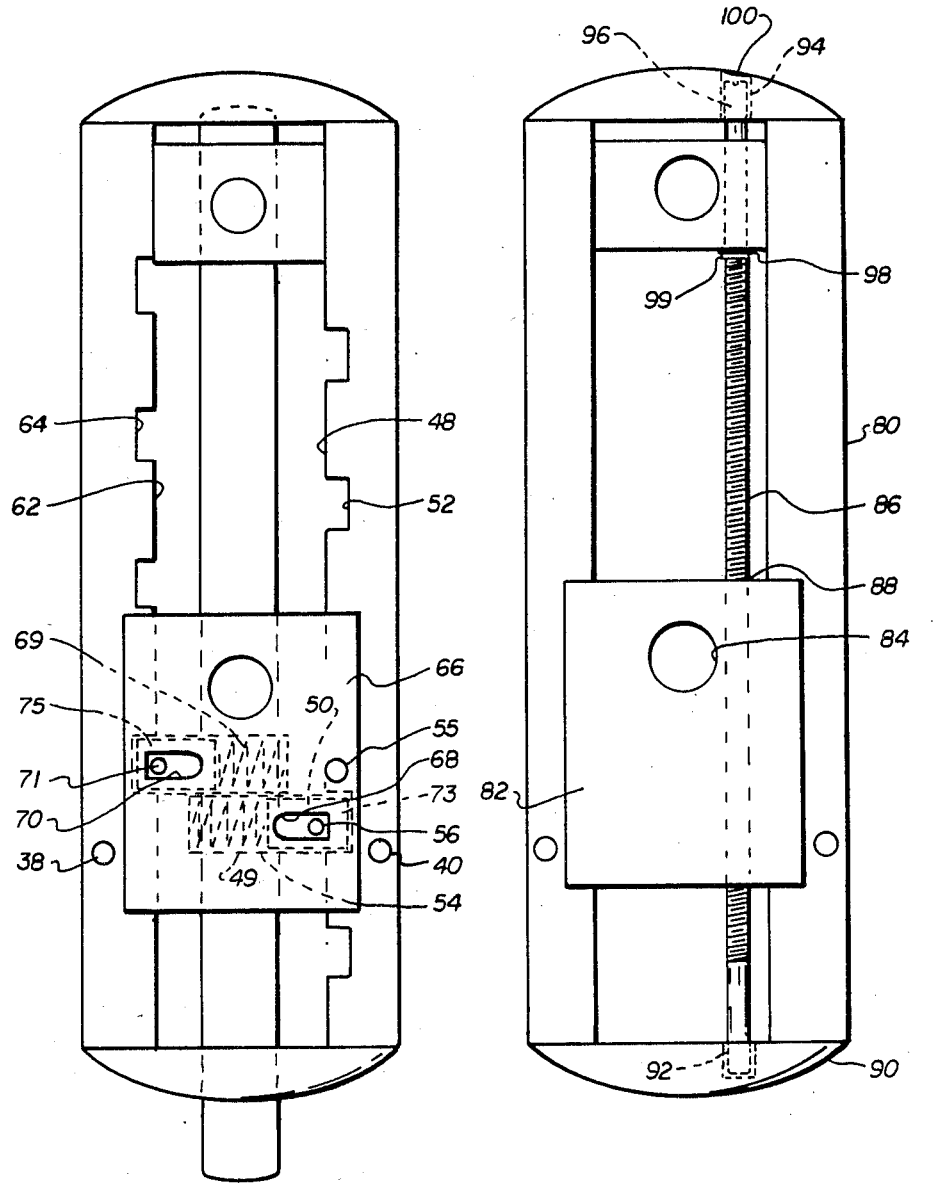
FIG. 4 shows a different embodiment of a guide rail arrangement from that shown in FIG. 2 and illustrates how the guide rail notches are offset, and shows the use of a pair of separate latches.

Another embodiment of the invention is illustrated in FIG. 4 where it may be seen that a second notched guide rail is employed. It will be noted that the second notched guide rail 62 has notches 64 which are offset from the notches 52 of the guide rail 48. This offset is employed so as to readily accommodate two separate spring-loaded latching detent devices 68 and 60 in a the limited space of the adjuster block 66. As shown in FIG. 4, the detent latches 73 and 75 are offset one from the other, and this offset is the same as that employed in the positioning of the notches 64 and 52 in the guide rails. This arrangement provides for a somewhat stronger latching arrangement, but has not been found to be absolutely necessary to hold the adjuster block 66 in the selected position.

Figures 5, 6:
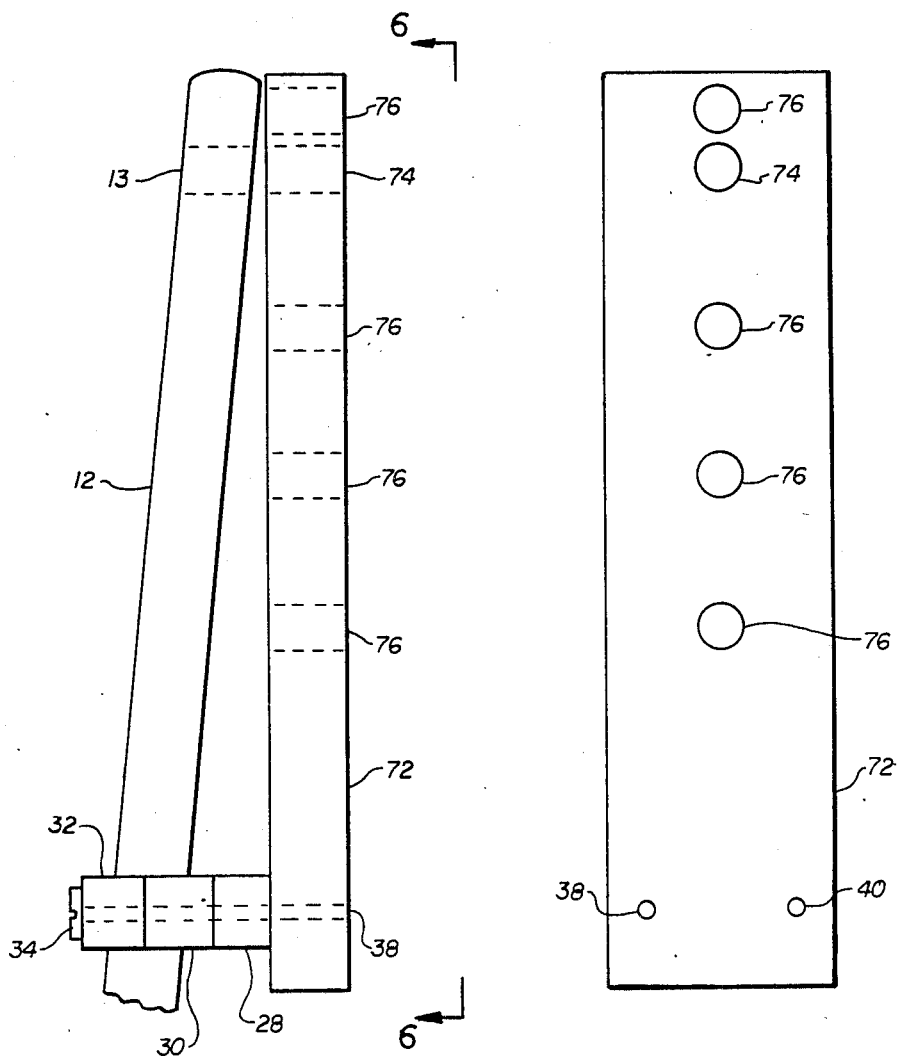
FIG. 5 is an elevation view of another embodiment of the invention in which adjustment of the pedal stroke is obtained by positioning the pedal (58) in one of the spaced apertures (74)
FIG. 6 is a view along the line 6—6 of FIG. 5.

Still another embodiment of the invention is illustrated in FIGS. 5 and 6, and in this case the adjustment is obtained by repositioning the pedal 58 (not shown). This is accomplished by threading the threaded pedal pin in one of the separate pedal pin threaded mounting apertures 76. It is to be noted that the pedal stroke adjuster 72 is adapted for mounting the crank arm 12 in the same manner as the pedal stroke adjuster assembly 20 was mounted as shown in FIG. 1.

In FIG. 7, another technique by which the pedal stroke may be adjusted is illustrated. The adjustable crank frame 80 includes a pedal mounting block 82, the crank frame being unnotched but designed to provide guide rails similar to those provided for pedal adjuster 42 as shown in FIG. 1. The pedal 58 would be inserted in the threaded pedal pin aperture 84 of pedal mounting block 82. The pedal mounting 82 is grooved to slide in the guide rails and includes a vertically threaded aperture 88 which is adapted to mate with the threads of rod 86. Rod 86 has threaads intermediate the ends thereof for adjusting the position of pedal mounting 82. A recess guide hole 90 is provided at the proximal end of the crank frame 80 and an unthreaded end 92 of rod 86 is inserted therein and will rotate freely as the rod turns. An aperture 94 is provided in the distal end of crank frame 80 and is adapted to accept the unthreaded upper part 96 of rod 86. A retainer washer 98 and pin 99 secures the rod in position once it is installed in the frame 80. The outboard end of the rod has a allen head 100 which may be recessed and yet permit ready adjustment of the pedal stroke.

While a pedal stroke adjustment adapter has been described for attachment to a standard bicycle crank, only a minor modification of the structure converts it into a single unit adjustable bicycle crank as shown in FIG. 8. Such arrangements are possible with European style bicycle drives in which a separate crank is attached to a spindle or bearing stud that is journalled in a housing such as shown as 16, FIG. 1. In this case, two separate cranks are employed, one being attached to one end of the bearing stud 101 and the other being attached to the other end of the spindle. The adjustable crank does not require a mounting bracket such as 24, nor the spacers 28 or shaped mounting blocks 30 and 32. What is required is mounting aperture 102 located at the proximal (housing) end 25 of each adjustable crank. The aperture is adapted to accept and attach to an end of said bearing stud for attachment thereto. As shown, the aperture 102 has a slot 104 at the bottom thereof. An aperture 106 mates with a threaded aperture 108. The aperture 102 is fitted over the end of the bearing stud and is secured by tightening screw 110, which clamps the aperture tightly against the bearing stud.

It is therefore to be realized that the embodiments represented in FIGS. 1–4 and 7 are designed to provide a strong pedal adjustment device which is quick and easy to adjust. The embodiment representation FIGS. 5 and 6 is inexpensive and strong although requiring more effort to adjust.

Although the present invention has been described herein in terms of presently preferred embodiments, it will be appreciated by those skilled in the art that alterations and modifications thereof may be readily made to suit particular needs and applications. It is therefore intended that the following claims be interpreted as covering all such alterations and modifications as fall within the true spirit and scope of the invention.

What is claimed is:

1. A pedal stroke length adjuster for a bicycle or exercise machine, wherein said bicycle or exercise machine has a drive means for converting pedal pressure into a propulsion force, said drive means having a bearing housing and a crank means having a pair of crank arms and a spindle therebetween, said crank arms extending in opposite directions from said spindle that is journaled in said bearing housing, which pedal stroke length adjuster comprises:

means for adjusting the length of the pedal stroke of the pedal stroke length adjuster to a plurality of selectable lengths, wherein said means for adjusting comprises:

a crank frame including a pair of crank frame sides in each of which an edge thereof forms a guide rail, and a pair of end plate members holding the crank frame sides together with the guide rails of said sides being parallel to each other and in the same plane;

pedal mounting and adjuster means adapted to ride on said guide rails for adjusting the pedal stroke including a mounting block having grooved sides adapted to slideably fit between said guide rails; and means for holding said pedal mounting and adjuster means in a plurality of selectable positions including at least one spring-loaded detent mechanism for driving a latch member out from the side of said mounting block and against a guide rail, and wherein at least one guide rail, which is adjacent said latch member of said detent mechanism, includes a plurality of spaced apart notches into which said latch may be seated, whereby the stroke length is fixed in a selected position;

means for attaching said pedal stroke length adjuster upon a crank arm of said drive means without physical modification of said crank arm.

2. A pedal stroke length adjuster for a bicycle or exercise machine, wherein said bicycle or exercise machine has a drive means for converting pedal pressure into a propulsion force, said drive means having a bearing housing and a crank means having a pair of crank arms and a spindle therebetween, said crank arms extending in opposite directions from said spindle that is journaled in said bearing housing, which pedal stroke length adjuster comprises:

means for adjusting the length of the pedal stroke of the pedal stroke length adjuster to a plurality of selectable lengths; and means for attaching said pedal stroke length adjuster upon a crank arm of said drive means without physical modification of said crank arm, wherein said means for attaching comprises:

a mounting bracket formed on the distal end of said crank frame, for attachment to a pedal mounting threaded aperture of said crank arm;

spacing means for aligning the proximal end of said crank frame so that it is vertical when in an operating condition;

shaped mounting means for attachment of said proximal end through said spacing means to said crank adjacent said housing; and means for fastening said spacing means and shaped mounting means to said crank frame, whereby said crank frame is firmly secured to said crank.

3. A pedal stroke length adjuster for a bicycle or exercise machine, which comprises:

drive means for converting pedal pressure into a propulsion force for said bicycle, said drive means including a bearing housing and a crank having a pair of crank arms, and a spindle therebetween, each crank arm having a pedal mounting threaded aperture at the distal end thereof, said arms extending in opposite directions from said spindle that is journalled in said bearing housing;

means for adjusting the length of the pedal stroke of said drive means including a crank frame having a pair of sides in each of which an edge thereof forms a guide rail, and a pair of end plate members holding the crank frame sides together with the guide rails of said sides being parallel to each other and in the same plane;

pedal mounting and adjuster means adapted to ride on said guide rails for adjusting the pedal stroke including a mounting block having grooved sides adapted to matingly fit into said guide rails;

at least one spring-loaded detent mechanism for driving a latch member out from the side of said mounting block and against a guide rail, and wherein at least one guide rail, which is adjacent said latch member of said detent mechanism, includes a plurality of spaced apart notches into which said latch may be seated, whereby the stroke length is fixed in a selected position;

means for attaching said adjusting means to said drive means including a mounting bracket formed on the distal end of said crank frame for attachment to said pedal mounting threaded aperture of said crank arm;

spacing means for aligning the proximal end of said crank frame so that it is vertical when in an operating condition;

shaped mounting means for attachment of said proximal end through said spacing means to said crank adjacent said housing, and means for fastening said spacing means and shaped mounting means to said crank frame, whereby said crank frame is firmly secured to said crank.

4. A pedal stroke length adjuster for a bicycle or exercise machine, wherein said bicycle or exercise machine has a drive means for converting pedal pressure into a propulsion force, said drive means having a bearing housing and a spindle that is journalled in said bearing housing, which pedal stroke length adjuster comprises:

- means for holding a pedal mounting and adjuster means, including a crank frame having a pair of crank frame sides in each of which an edge thereof forms a guide rail, and a pair of end plate members holding the crank frame sides together with the guide rails of said sides being parallel to each other and in the same plane;

pedal mounting and adjuster means adapted to ride on said guide rails for adjusting the pedal stroke including a mounting block having grooved sides adapted to slideably fit between said guide rails; and means for holding said pedal mounting and adjuster means in a plurality of selectable positions including at least one spring-loaded detent mechanism for driving a latch member out from the side of said mounting block and against against a guide rail, and wherein at least one guide rail, which is adjacent said latch member of said detent mechanism, includes a plurality of spaced apart notches into which said latch may be seated, whereby the stroke length is fixed in a selected position; and means for attaching said pedal stroke length adjusting means to said spindle of said drive means.

5. A pedal stroke length adjuster as set forth in claim 4 wherein said means for attaching includes an aperture formed in an end plate of said frame for the insertion of said spindle therethrough, and a means for fixedly engaging said spindle within said aperture.

* * * * *